US012587123B2

(12) United States Patent
Sprenger et al.

(10) Patent No.: US 12,587,123 B2
(45) Date of Patent: Mar. 24, 2026

(54) CONTROL DEVICE AND METHOD FOR CONTROLLING A POWER CONVERTER, AND ELECTRICAL DRIVE SYSTEM

(71) Applicant: Robert Bosch GmbH, Stuttgart (DE)

(72) Inventors: Helge Sprenger, Kornwestheim (DE); Thomas Zeltwanger, Asperg (DE)

(73) Assignee: Robert Bosch GmbH, Stuttgart (DE)

( * ) Notice: Subject to any disclaimer, the term of this patent is extended or adjusted under 35 U.S.C. 154(b) by 148 days.

(21) Appl. No.: 18/683,320

(22) PCT Filed: Jul. 25, 2022

(86) PCT No.: PCT/EP2022/070757

§ 371 (c)(1),
(2) Date: Feb. 13, 2024

(87) PCT Pub. No.: WO2023/030760

PCT Pub. Date: Mar. 9, 2023

(65) Prior Publication Data

US 2024/0348189 A1 Oct. 17, 2024

(30) Foreign Application Priority Data

Sep. 3, 2021 (DE) ..................... 10 2021 209 685.9

(51) Int. Cl.
*H02P 3/22* (2006.01)
*B60L 3/04* (2006.01)
(Continued)

(52) U.S. Cl.
CPC .............. *H02P 27/06* (2013.01); *H02P 21/14* (2013.01)

(58) Field of Classification Search
CPC ........ H02M 7/5387; B60L 3/04; B60L 15/20; B60L 3/0038; B60L 3/003;
(Continued)

(56) References Cited

U.S. PATENT DOCUMENTS

2008/0252244 A1* 10/2008 Palma ..................... H02P 6/185
327/306
2010/0270955 A1* 10/2010 Yamakawa ......... H02P 23/0004
318/139
(Continued)

FOREIGN PATENT DOCUMENTS

DE 102011086079 A1 5/2013
DE 102012216008 A1 3/2014
(Continued)

OTHER PUBLICATIONS

Translation of International Search Report for Application No. PCT/EP2022/070757 dated Nov. 29, 2022 (3 pages).

*Primary Examiner* — Gabriel Agared
(74) *Attorney, Agent, or Firm* — Michael Best & Friedrich LLP

(57) ABSTRACT

The invention relates to an expanded control scheme for an electrical machine (2). In particular, it is provided to change specifically into a freewheeling state in the event that only a low torque or a low phase current is to be set at the electrical machine (2). In order to change into the freewheeling state, additionally the actual rotational speed of the electrical machine (2) is taken into consideration.

8 Claims, 3 Drawing Sheets

(51) Int. Cl.
    *H02P 21/14*        (2016.01)
    *H02P 27/06*        (2006.01)

(58) Field of Classification Search
    CPC ........... B60L 2240/429; B60L 2240/80; B60L
                       2240/421; B60L 2210/40; B60L
            2240/529; B60L 2240/423; H02P 27/06;
            H02P 21/14; H02P 3/22; H02P 23/0027
    USPC ........................................................ 318/503
    See application file for complete search history.

(56) References Cited

U.S. PATENT DOCUMENTS

| | | | |
|---|---|---|---|
| 2012/0081064 A1* | 4/2012 | Leaver .................... | H02P 23/26 |
| | | | 318/721 |
| 2012/0249155 A1* | 10/2012 | Bruckhaus ................ | B60L 3/04 |
| | | | 324/537 |
| 2014/0167669 A1* | 6/2014 | Lim ...................... | B60L 3/0061 |
| | | | 324/750.02 |
| 2014/0217817 A1* | 8/2014 | Raichle ................... | B60L 58/12 |
| | | | 307/10.1 |
| 2017/0077843 A1* | 3/2017 | Grossmann ............. | H02P 6/085 |
| 2018/0262149 A1* | 9/2018 | Uchida ............... | H02P 29/0241 |
| 2021/0237603 A1* | 8/2021 | Wang ...................... | B60K 6/48 |

FOREIGN PATENT DOCUMENTS

| | | |
|---|---|---|
| DE | 102013213046 A1 | 12/2014 |
| DE | 102013226560 A1 | 6/2015 |
| DE | 102014208747 A1 | 11/2015 |

* cited by examiner

CONTROL DEVICE AND METHOD FOR CONTROLLING A POWER CONVERTER, AND ELECTRICAL DRIVE SYSTEM

BACKGROUND

The present invention relates to a control device as well as a method for controlling a power converter, in particular a power converter in an electrical drive system. The present invention furthermore relates to an electrical drive system.

Electrical drive systems typically comprise an electrical machine powered by an electric power source. In this case, a power converter is provided between the power source and the machine, which controls the electrical machine according to target values. For example, a DC voltage supplied by the electric power source can be converted to a single-phase or multi-phase alternating electric voltage by means of a pulse width modulated control of the switching elements in the power converter, which is suitable for controlling the electrical machine according to the target value specifications. The voltage level at the output of the voltage converter can be set by varying the duty cycle.

In addition, the power converter can also set a so-called active short circuit, in which the phase terminals of the electrical machine are shorted together via the switching elements of the power converter. Furthermore, a so-called freewheeling state exists, in which all switching elements of the power converter are open.

Publication DE 10 2013 226 560 A1 describes a change from freewheeling operation into an active short circuit of an electrical machine. Here, it is proposed to delay the change from freewheeling into the active short circuit until predetermined voltage ratios are set on outer terminals of the electrical machine.

SUMMARY

The present invention creates a control device and a method for controlling a power converter, in particular a power converter in an electrical drive system, as well as an electrical drive system.

Accordingly, the following is provided:

A control device for controlling a power converter in an electrical drive system. The control device is designed to detect a target value and/or a current value for controlling the power converter. The control device is further designed to determine a speed or an electrical frequency of an electrical machine of the drive system. Furthermore, the control device is designed to activate a freewheeling state in the electrical power converter if the detected target value and/or actual value for controlling the power converter fall below a predetermined first threshold value and the determined speed or the electrical frequency of the electrical machine falls below a predetermined limit value.

The following is furthermore provided:

An electrical drive system comprising an electrical machine, a power converter and a control device according to the invention. The electrical power converter is designed to be connected to the electrical machine and an electric power source. Furthermore, the power converter is designed to control the electrical machine using a target value specification.

Finally, the following is provided:

A method for controlling a power converter in an electrical drive system. The method comprises a step of detecting a target value and/or a current value for controlling the power converter. Furthermore, the method comprises a step of determining a speed and/or an electrical frequency of an electrical machine of the drive system. Finally, the method comprises a step of activating a freewheeling state in the electrical power converter. The freewheeling state is in particular activated if the detected target value and/or actual value for controlling the power converter fall below a predetermined first threshold value and the determined speed or electrical frequency of the electrical machine fall below a predetermined limit value.

The present invention is based on the knowledge that regulation systems for the power converters of an electrical drive system for setting a so-called zero vector, that is to say, for setting a current of zero amperes (A) or a torque of zero Newton meters (Nm), typically change between two switching states, wherein, in the first switching state, the switching elements of the upper half bridges of the power converter are closed, and in the second switching state, the switching elements of the lower half bridges of the power converter are closed. Both switch states correspond to an active short circuit of the phase terminals of the connected electrical machine.

When switching between the two switching states, in each case a switching operation of the switching elements involved in the power converter takes place. In particular, the simultaneous switching of all switching elements in the upper half bridges and the lower half bridges represents a relatively high load from the point of view of electromagnetic compatibility. In addition, these switching operations cause switching losses on the high voltage side and control current losses in the electrical machine. Furthermore, losses are also expected in the control of the power electronics by the driver stages for controlling the semiconductor switching elements as well as for generating the required control signals.

It is therefore an idea of the present invention to take this knowledge into account and to reduce to a minimum switching operations in which all switching elements of the upper half bridges or lower half bridges of an electrical power converter in a drive system switch simultaneously or approximately simultaneously.

According to the present invention, it is provided for this purpose to monitor target values and/or actual values for the operation of the electrical drive system, in particular for the control of a power converter in such a drive system, and to detect operating states in which simultaneous or at least approximately simultaneous switching of all switching elements of the upper half bridges or lower half bridges in a power converter is to be expected. In such cases, a freewheeling state can be specifically set. In such a freewheeling state, all switching elements of the power converter are open. At best, current can therefore flow via the freewheeling diodes in parallel with the switching elements in the power converter.

In principle, any target value specification, which can lead to the simultaneous switching of the switching elements in the upper half bridges or lower half bridges of the power converter, can be used as a condition for the change into the freewheeling state. For example, these target value specifications can be for setting a torque of 0 Nm or a torque having an amount below a predetermined upper limit. Alternatively, the target value specification can also comprise a target value specification for an electrical current, in particular the phase currents on the phase terminals of the electrical machine. For example, a change into the freewheeling state can be considered if a phase current of 0 A or a current with a value below a predetermined limit is specified. Furthermore, any other target value specifications are of course also possible, which lead to simultaneous control of the switching elements in the upper half bridges or lower half bridges of the power converter.

In addition to a consideration of target value specifications for controlling the switching elements in the power converter, it is additionally or alternatively also possible to consider actual values of operating states in the electrical drive system, in particular the power converter. For example, electrical currents at the phase terminals between the power converter and the electrical machine can be sensor-detected and evaluated. If the magnitude of the phase currents falls below a predetermined threshold value, this can also be considered an indication that the switching elements in the upper or lower half bridges of the power converter are being controlled simultaneous or at least approximately simultaneous. Furthermore, it is also possible to directly consider the control signals for the switching elements in the power converter or to use data used for generating the control signals for controlling the switching elements.

In addition to the previously described target and/or actual values, the rotational speed of the electrical machine or the electrical frequency is also taken into consideration. For example, a change to freewheeling can only be activated when the electrical machine is at a standstill or the speed is below a predetermined limit value. This limit value can be limited on the one hand to relatively low speeds near zero. In addition, it is also possible to enable a change to freewheeling for higher speeds. In particular, the change to freewheeling can also be released for higher speeds as long as an electrical voltage generated by the rotation of the electrical machine is less than an electrical voltage supplied by an electric power source that powers the electrical power converter. In this way, an inverse flow of current from the electrical machine via the freewheeling diodes of the electric switching elements in the direction of the electric power source can be prevented.

According to one embodiment, the target value comprises a target value specification for electrical currents in the electrical machine. In particular, the target value specification can comprise a specification for the phase currents at the phase terminals of the electrical machine. Additionally or alternatively, the target value specification can also have a specification for a torque to be set at the electrical machine. Accordingly, a change into the freewheeling state can be provided if the magnitude of the electrical currents to be set according to the target value specification is below a predetermined threshold value or the magnitude of the torque to be set at the electrical machine is below a predetermined threshold value. In these cases, it can be expected that the switching elements in the electrical power converter in the upper or lower half bridges are controlled simultaneously or at least approximately simultaneously for setting an electrical current of 0 A or at least approximately 0 A, or a torque of 0 Nm or at least approximately 0 Nm.

According to one embodiment, the actual value to be considered comprises a measured electric current of the electrical machine. For example, the phase currents between the electrical power converter and the phase terminals of the electrical machine can be detected by means of suitable sensors. Additionally or alternatively, the switching signals for the switching elements in the electrical power converter can also be considered as the actual value. For example, the timing of the control signals for the switching elements can be evaluated to identify simultaneous or at least approximately simultaneous switching of the switching elements in the upper or lower half bridges of the power converter.

According to one embodiment, the control device is designed to receive at least one further control signal from an external control device. In this case, the control device can be designed to activate or also optionally deactivate the freewheeling state using the received control signal from the external control device. The external control signal can comprise any external control signal which affects the decision whether the freewheeling state should or can be activated. For example, the external control signal can have fault information from an external control device, wherein the external control device monitors the power converter or the entire electrical drive system. In particular, such additional control signals can also be used to indicate whether the received target and/or actual values are sufficiently reliable. For example, if it is determined that a current sensor has a fault, this can be signaled so that the values of such a faulty current sensor are not included in the decision to switch to freewheeling. In addition, any other external control signals are also possible, which indicate, for example, whether a change into a freewheeling state is permitted or possible in a current operating state. If necessary, a control signal from an external control device can also signal that a change into a freewheeling state is expressly desired or prohibited.

According to one embodiment, the control device is designed to activate the freewheeling state if the aforementioned conditions for a change to the freewheeling are met state for at least a predetermined period of time. Accordingly, the control device can only change into a freewheeling state, for example, after the detected target value and/or actual value for controlling the power converter has fallen below the predetermined first threshold value for at least a predetermined period of time and the determined speed or electrical frequency of the electrical machine has fallen below the predetermined maximum limit value for at least the predetermined period of time. In this way, a frequent change between the normal operating mode with, for example, pulse width modulated control, and the freewheeling state can be prevented or at least reduced, in particular in a limit range.

According to one embodiment, the control device is arranged to deactivate a regulation of the electric current for the electrical machine in the drive system when the freewheeling state is activated. Deactivating the current regulation during the activated freewheeling state can prevent the state of the current regulator from drifting during the freewheeling state. Alternatively, the regulator can also be reset if the freewheeling state is to be exited.

According to one embodiment, the control device is designed to deactivate an activated freewheeling state if a target value for controlling the power converter exceeds a predetermined second threshold value or the determined speed or electrical frequency of the electrical machine exceeds the predetermined limit value. In this way, after an activated freewheeling state, it is possible to switch back to the normal operating mode, for example with pulse width modulated control of the switching elements in the power converter. A hysteresis, for example, can be provided in this case between the first threshold value for activating the freewheeling state and the second threshold value for deactivating the freewheeling state. Additionally or alternatively, a hysteresis can also be provided for the limit value in connection with the speed or the electrical frequency. In this way, too frequent a change between the normal operating mode and freewheeling state can be prevented, especially in limit situations.

According to one embodiment, the control device is designed to set the threshold value for the speed or the electrical frequency using an input DC voltage of the power converter. For example, the limit value for the speed can be set such that the freewheeling state is only activated if, due to the voltage induced by the electrical machine during freewheeling, no voltage is applied on the DC voltage side, which is higher than the electrical voltage of the DC input voltage. In particular, in addition to the DC input voltage, an exciter flow in the electrical machine, for example, can also be considered. The limit value for the maximum speed or electrical frequency can, for example, be predetermined as a map depending on the input DC voltage and a rotor temperature of the electrical machine and stored in a memory of the control device. In addition, any other criteria for setting the limit value for the maximum speed of the electrical machine are of course possible.

The above configurations and further developments can be arbitrarily combined with one another as far as is reasonable. Further configurations, further developments, and implementations of the invention also include combinations not explicitly mentioned of features of the invention described above or below with respect to the embodiment examples. The person skilled in the art will in particular also add individual aspects as improvements or additions to the respective basic forms of the invention.

BRIEF DESCRIPTION OF THE DRAWINGS

Further features and advantages of the invention are explained hereinafter with reference to the figures. Shown are.

Unless otherwise stated, the same reference numbers refer to like or functionally identical components shown in the figures.

DETAILED DESCRIPTION

Figure 1:
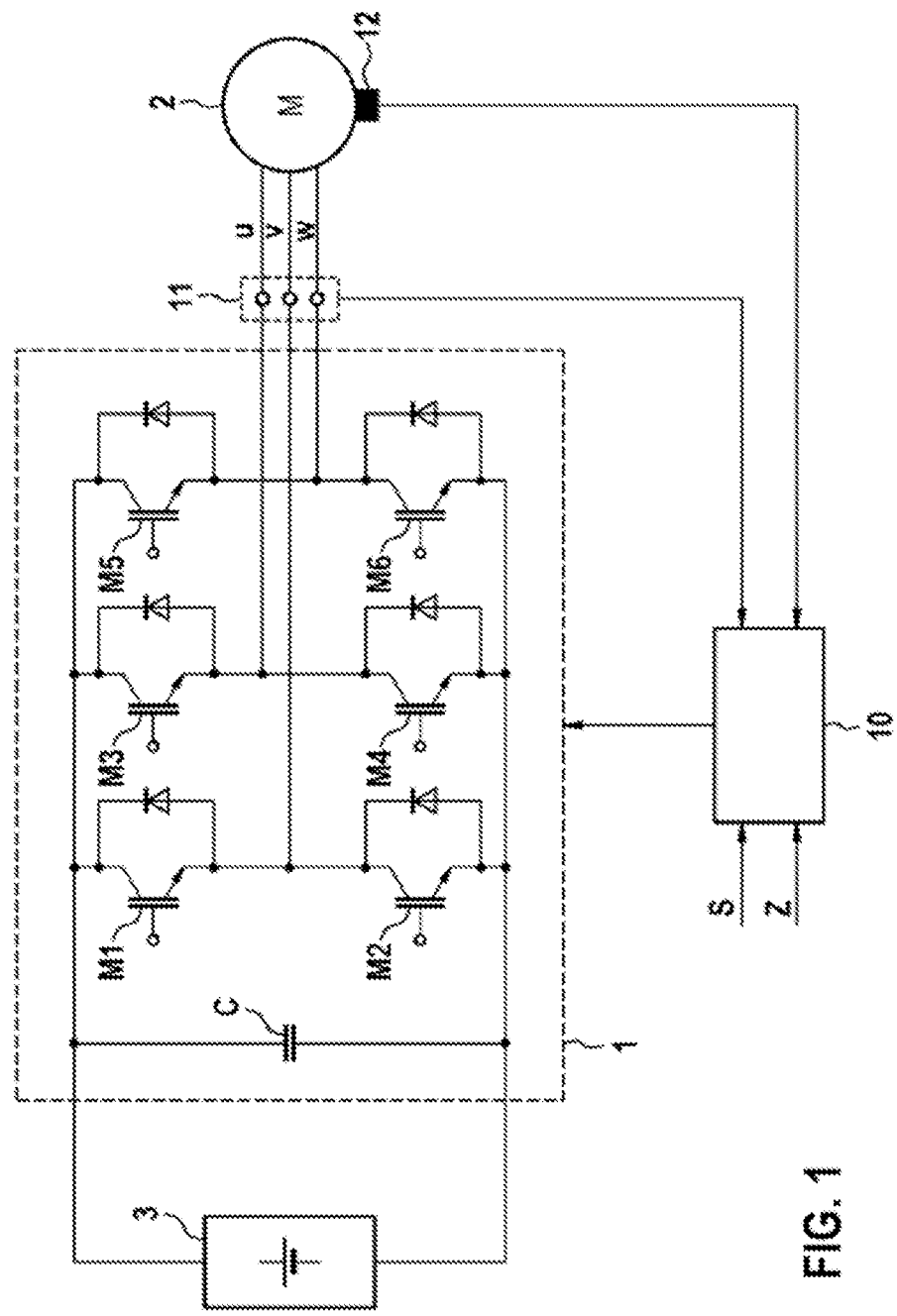
FIG. 1: a schematic representation of a block diagram of an electrical drive system comprising a control device according to one embodiment.

FIG. 1 shows a schematic representation of a block diagram for an electrical drive system according to one embodiment. The electrical drive system comprises an electrical power converter 1 and an electrical machine 2. Here, the connections at the output of the power converter 1 are connected to the phase terminals U, V, W of the electrical machine 2. The embodiment example shown here is a three-phase electrical machine 2 that is powered by a three-phase inverter 1. Furthermore, electrical drive systems with one of three different phase numbers are of course also possible.

The electrical drive system, in particular the power converter 1, is supplied by an electric power source 3, in particular a DC voltage source, such as the traction battery of an electric vehicle. On the input side, a so-called DC link capacitor C can be provided in the electrical power converter 1.

For each electrical phase, the power converter 1 comprises a so-called half bridge with two switching elements.

In the embodiment example shown here, the power converter 1 thus comprises three half bridges with the switching elements M1 to M6. Here, the switching elements M1, M3, M5 connected to a first terminal (for example, the positive terminal) of the DC voltage source 3 can be referred to as upper switching elements, and the switching elements M2, M4, M6 connected to the other terminal (for example, the negative terminal) of the electric power source 3 can be referred to as the lower switching elements.

To control the electrical machine 2, the switching elements M1 to M6 in the power converter 1 are each opened and closed in a controlled manner. For this purpose, corresponding control signals can each be provided by the control device 10 of the power converter 1 to the switching elements M1 to M6. For this purpose, a pulse width modulation (PWM), for example, can be used to control the individual switching elements M1 to M6. During such pulse width modulated control, generally either one upper switching element M1, M3, M5 is opened and the respective corresponding lower switching element M2, M4, M6 is closed, or, complimentarily, the upper switching element M1, M3, M5 is opened and the respective corresponding lower switching element M2, M4, M6 is closed. In this case, a so-called dead time can be provided between the switching operations for the upper switching elements and the switching operations for the corresponding lower switching elements.

One or more target values S can be provided on the control device 10, for example. For example, these target values S can include a torque to be set at the electrical machine, a desired speed of the electrical machine 2, target values points for the phase currents of the electrical machine 2, or any other target value specifications. If necessary, additional further signaling Z can also be provided on the control device 10. Furthermore, the electrical currents from the power converter 1 to the electrical machine 2 can be detected by means of suitable current sensors 11 and the sensor signals from these current sensors 11 can also be provided to the control device 10. Furthermore, an angular position of the rotor or a speed of the electrical machine 2 can also be detected by means of a suitable sensor 12, and the sensor values of this sensor 11 can also be provided to the control device 10.

Based on the target value specifications S and the further sensor values or specifications possibly provided, the control device 10 can generate suitable control signals for the switching elements M1 to M6 and provide them to the respective switching elements M1 to M6.

If no torque is to be provided on the electrical machine 2, i.e. a target value of 0 Nm, or if the phase currents of the electrical machine 2 are to be set to 0 A, then the control device 10 can simultaneously close all upper switching elements M1, M3, M5 or all lower switching elements M2, M4, M6 and thus connect the phase terminals of the electrical machine 2 to each other. Such a state is also referred to as an active short circuit. In this case, it is possible for control device 10 to alternately close either the upper switching elements M1, M3, M5 or the lower switching elements M2, M4, M6 and thereby open the corresponding other switching elements.

In order to prevent such an alternating opening and closing of the switching elements M1 to M6, the control device 10 can detect such operating states and subsequently open all the switching elements M1 to M6. This state is referred to as freewheeling.

The control device 10 can, for example, monitor the target value specifications S and use an analysis of the received target value specifications S to detect an operating state in which either the upper switching elements M1, M3, M5 or the lower switching elements M2, M4, M6 are to be closed simultaneously or at least almost simultaneously in all half bridges. As already mentioned above, this can be the specification of a torque of 0 Nm to be set.

In addition, target value specifications for the torque can also be considered, whereby the amount of the torque to be set is below a predetermined threshold. It is also possible to analyze a target value specification for an electric current to be set from the outputs of the power converter 1 to the electrical machine 2. If the amount or amplitude of the electric current to be set in the phases from the power converter 1 to the electrical machine 2 is below a predetermined threshold, this can also be considered an indication that the switching elements of the upper half-bridges M1, M3, M5 and the switching elements of the lower half-bridges M2, M4, M6 are switched simultaneously or at least approximately simultaneously. Furthermore, any other target value specifications are of course also possible, from which it can be derived that the switching elements of the upper half bridges M1, M3, M5 and the switching elements of the lower half bridges M2, M4, M6 are switched simultaneously or at least approximately simultaneously. The term "switch at least approximately simultaneously" means that the switching operations of the switching elements M1, M3, M5 in the upper half bridge and the switching operations for the switching elements M2, M4; M5 in the lower half bridge are switched within a predetermined period of time.

In addition to consideration of target value specifications S to determine whether the switching elements M1, M3, M5 in the upper half bridge and the switching elements M2, M4, M6 in the lower half bridge are switched simultaneously or at least approximately simultaneously, a consideration of suitable actual values is also possible. For this purpose, measured values of the electrical currents between the power converter 1 and the electrical machine 2, for example, can be evaluated. If the amount or the amplitude of these electrical currents is below a predetermined threshold value, it can also be concluded from this, for example, that the corresponding switching elements M1 to M6 in the power converter are switched simultaneously or at least approximately simultaneously. Furthermore, it is possible to directly evaluate the control signals for controlling the switching elements M1 to M6 or to use data or signals that are used to generate these control signals. It is understood of course that any other suitable measured values or signals can also be used to characterize the switching behavior of the individual switching elements M1 to M6 of the power converter 1.

In addition to the evaluation of target or actual values described for characterizing the switching behavior of the switching elements M1 to M6 of the power converter 1, the speed of the electrical machine 2 or the electrical frequency of the electrical machine 2 can also be considered for the decision whether the switching elements M1 to M6 are to be controlled for freewheeling. For example, a change into freewheeling can only be allowed if, in addition to the above-mentioned conditions for the target or actual values, the speed of the electrical machine 2 is also below a predetermined limit value. In this way, for example, freewheeling can be set only when the electrical machine 2 is at a standstill or rotating at low speeds. Alternatively, it is also possible to enable a change into freewheeling as long as a rotating electrical machine 2 with the current speed does not generate an electric voltage at the outputs of the electrical machine, which generates a voltage via the freewheeling diodes in the power converter 1 at the input side of the power converter 1 that is higher than the electric voltage supplied by the electric power source 3.

For example, a fixed maximum speed can be specified for the electrical machine 2. Alternatively, it is also possible to dynamically adjust the upper limit for the maximum allowed speed of the electrical machine 2. For example, the upper limit for the maximum allowed speed can be adjusted as a function of the voltage level at the input or DC link capacitor C of the power converter 1. In addition, further parameters, such as excitation flow in the electrical machine 2, rotor temperature in the electrical machine 2, or the like, can also be considered. The upper limit for the maximum speed at which a change into freewheeling is still possible can be calculated either by means of a suitable mathematical formula or an algorithm. Alternatively, it is also possible to calculate a characteristic map beforehand and store this characteristic map in a memory (not shown) of control device 10.

After the aforementioned conditions are met, that is to say, the speed is below the predetermined upper limit for the speed of the electrical machine and, based on the target and/or actual values, simultaneous or at least approximately simultaneous switching of the switching elements M1, M3, M5 of the upper half bridges or M2, M4, M6 of the lower half bridges, a freewheeling state can then be set in the power converter 1, in which all switch elements M1 to M6 are opened.

For example, the speed of the electrical machine can be sensor-detected by a speed sensor 12. Additionally or alternatively, the speed or electrical frequency can also be derived or calculated from control parameters.

During the freewheeling state, the current regulation in the control device 10 is deactivated. In other words, as long as the freewheeling state is set, the control loop between target values for the torque or phase currents, and the actual values of the phase currents is disabled. This prevents the regulation state from drifting during freewheeling.

In addition to the aforementioned conditions for activating the freewheeling state in the power converter 1, further parameters or signaling Z can also be considered for activating or deactivating the freewheeling state. For example, additional signaling about possible malfunctions can be provided to control device 10. For example, such signaling Z can signal a malfunction within the electrical drive system, in particular one or more components of the electrical drive system. If a malfunction is detected in one of the current sensors 11, for example, the data from this current sensor 11 can no longer be considered. If necessary, after signaling Z of a malfunction, a change into the freewheeling state can be completely prevented.

In addition, signaling Z is also possible, which indicates on the control device 10 whether the drive system is in a state in which a change into the freewheeling state is possible or not. Furthermore, signals can also be provided on the control device 10, through which an external control device signals that a freewheeling state is currently desired.

If necessary, it is also possible to initially delay the change into the freewheeling state by a predetermined time period. In this way, for example, it can be ensured that a frequent change between the normal operation mode with pulse width modulated control and freewheeling is prevented, particularly in limiting cases.

If the conditions described above are no longer met after a change into freewheeling, i.e. a significant torque is to be set at the electrical machine or a significant current is to flow between the power converter 1 and electrical machine 2, the freewheeling state can be deactivated. As before freewheeling, a normal pulse width modulated control of the switching elements M1 to M6 then occurs. For this purpose, the target value specifications S, for example, specifications for the torque or the electric current to be set between the power converter 1 and the electrical machine 2, can be monitored during freewheeling. Furthermore, the speed of the electrical machine 2 is also monitored to detect whether the speed of the electrical machine 2 increases during freewheeling and the conditions for freewheeling are therefore no longer met.

In order to avoid too rapid a change between freewheeling and the normal operating state, a hysteresis can be provided, for example, between the limit value for a change to freewheeling and the limit value for the change from freewheeling to the normal operating mode.

It is understood that the conditions for activating or deactivating freewheeling must be monitored quickly enough to prevent any losses of torque dynamics. For example, the respective checks for activating or deactivating freewheeling can take place in a time grid of 1 millisecond (ms), 2 ms, or 10 ms.

Figure 2:
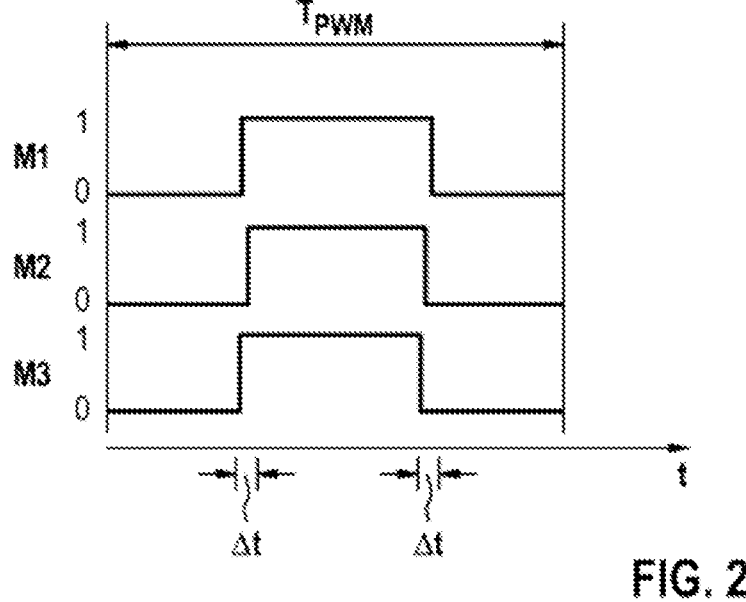
FIG. 2: a schematic representation of a timing diagram illustrating the switching times of the switching elements in an electrical power converter.

FIG. 2 shows a schematic representation of a timing plot for controlling or switching the switching elements M1, M3, M5 of the upper half bridge in a three-phase power converter. The complementary switching elements M2, M4, M6 of the lower half bridge are switched complementarily taking into account a predetermined dead time. As can be seen here, to set a torque in the range of approximately 0 Nm and a corresponding phase current of approximately 0 A, all switching elements M1, M3, M5 of the upper half bridge are switched simultaneously or at least approximately simultaneously within a tolerance of Δt. Accordingly, all phase terminals of the electrical machine 2 are electrically connected to each other via the upper switching elements M1, M3, M5 or the lower switching elements M2, M4, M6. In such a case, according to the present invention, it is possible to switch from the active control with a periodic change between open and closed switching elements M1 to M6 into a freewheeling state, in which all switching elements M1 to M6 are permanently open.

Figure 3:
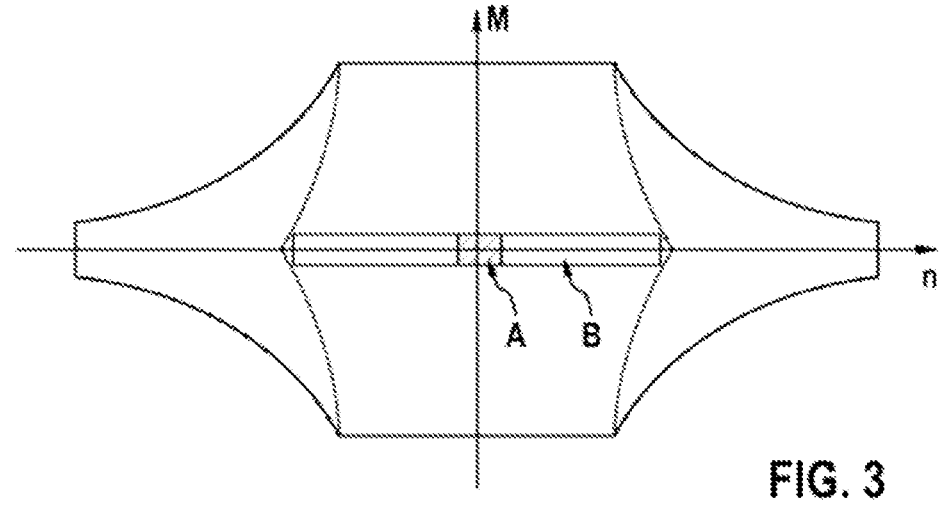
FIG. 3: a schematic representation of the activation areas for a freewheeling state, according to one embodiment.

FIG. 3 shows a schematic representation of possible activation ranges A or B for freewheeling as a function of speed n and torque M. As can be seen in FIG. 3, on the one hand, it is possible to activate freewheeling only within a relatively narrow speed range A. In this case, freewheeling is activated only if the amount of the torque M to be adjusted is below a predetermined threshold and, in addition, the current speed n of the electrical machine 2 is also approximately zero. Alternatively, it is also possible to activate freewheeling over a greater speed range, as shown by activation range B. In this case, the change to freewheeling can extend to almost the limit of the basic speed range, which is represented by the dashed line in FIG. 3.

Figure 4:
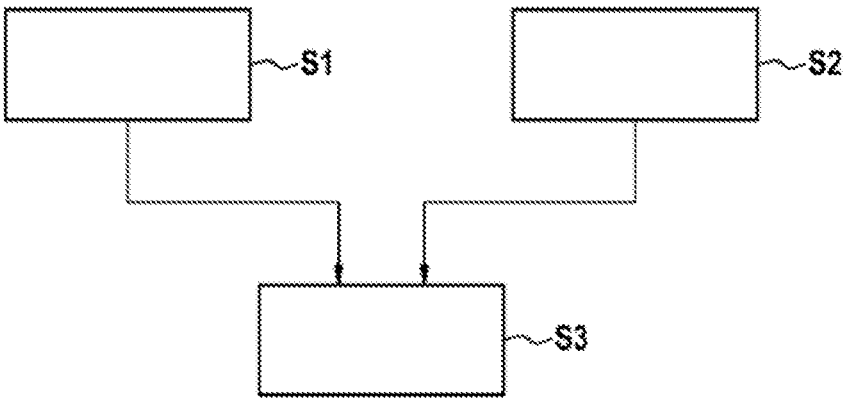
FIG. 4: a flowchart as it underlies a method for controlling a power converter, according to one embodiment.

FIG. 4 shows flowchart as it underlies a method for controlling a power converter, according to one embodiment. The method generally comprises any of the steps described above in connection with the electrical drive system and the power converter 1 contained therein with the control device 10.

In step S1, at least one target value S and/or a current value for controlling the power converter is detected. These can be any target or actual values as described above.

In step S2, the speed or the electrical frequency of an electrical machine in the drive system is determined.

In step S3, a freewheeling state is activated in the electrical power converter. The freewheeling state is in particular then activated if the detected target value and/or the detected actual value for controlling the power converter falls below a predetermined first threshold value and the determined speed or electrical frequency of the electrical machine falls below a predetermined limit value.

In summary, the present invention relates to an expanded control scheme for an electrical machine. In particular, it is provided to change specifically into a freewheeling state in the event that only a low torque or a low phase current is to be set at the electrical machine. In addition, the current speed of the electrical machine is also considered for the change to freewheeling.

The invention claimed is:

1. A control device (10) for controlling a power converter (1) in an electrical drive system, wherein the control device (10) is configured to:

detect a target value (S) for controlling the power converter (1), the target value (S) including a torque to be set in an electrical machine (2) of the drive system, determine a speed or an electrical frequency of the electrical machine (2) of the drive system, and activate a freewheeling state in the electrical power converter (1) if the detected target value (S) for controlling the power converter (1) falls below a predetermined first threshold value and the determined speed or electrical frequency of the electrical machine (2) falls below a predetermined maximum threshold value.

2. The control device (10) according to claim 1, wherein the control device (10) is configured to receive at least one further control signal (Z) from an external control device and set the freewheeling state using the received control signal (Z) from the external control device.

3. The control device (10) according to claim 1, wherein the control device (10) is configured to activate the freewheeling state, after the detected target value (S) for controlling the power converter (1) has fallen below the predetermined first threshold value for at least a predetermined period of time and the determined speed or electrical frequency of the electrical machine (2) has fallen below the predetermined maximum limit value for at least the predetermined period of time.

4. The control device (10) according to claim 1, wherein the control device (10) is configured to deactivate a regulation of the electric current for the electrical machine (2) in the drive system when the freewheeling state is activated.

5. The control device (10) according to claim 1, wherein the control device (10) is configured to deactivate an activated freewheeling state if a target value for controlling the power converter exceeds a predetermined second threshold value or the determined speed or electrical frequency of the electrical machine (2) exceeds the predetermined threshold value.

6. The control device (10) according to claim 1, wherein the control device (10) is configured to set the threshold value for the speed or electrical frequency using an input DC voltage of the power converter.

7. An electrical drive system comprising:

an electrical machine (2);

an electrical power converter (1) configured to control the electrical machine (2) using a target value (S); and a control device (10) configured to detect a target value (S) for controlling the power converter (1), the target value (S) including a torque to be set in the electrical machine (2) of the drive system, determine a speed or an electrical frequency of the electrical machine (2) of the drive system, and activate a freewheeling state in the electrical power converter (1) if the detected target value (S) for controlling the power converter (1) falls below a predetermined first threshold value and the determined speed or electrical frequency of the electrical machine (2) falls below a predetermined maximum threshold value.

8. A method for controlling a power converter (1) in an electrical drive system, with the steps of:

detecting (S1) a target value (S) for controlling the power converter (1), the target value (S) including a torque to be set in an electrical machine (2) of the drive system, determining (S2) a speed or an electrical frequency of an electrical machine (2) of the drive system, and activating (S3) a freewheeling state in the electrical power converter (1) if the detected target value (S) and/or actual value for controlling the power converter (1) falls below a predetermined first threshold value and the determined speed or electrical frequency of the electrical machine (2) falls below a predetermined threshold value.

\* \* \* \* \*